(12) United States Patent
Brodsky et al.

(10) Patent No.: US 8,285,515 B2
(45) Date of Patent: Oct. 9, 2012

(54) CHARACTERIZATION OF SINGLE-PHOTON DETECTORS USING A SOURCE OF PHOTON PAIRS

(75) Inventors: Michael Brodsky, Millburn, NJ (US); Cristian Antonelli, Sulmona (IT); Jungmi Oh, Daejeon (KR)

(73) Assignee: AT&T Intellectual Property I, L.P., Atlanta, GA (US)

( * ) Notice: Subject to any disclaimer, the term of this patent is extended or adjusted under 35 U.S.C. 154(b) by 265 days.

(21) Appl. No.: 12/834,940

(22) Filed: Jul. 13, 2010

(65) Prior Publication Data

US 2012/0016634 A1 Jan. 19, 2012

(51) Int. Cl.
*G06F 17/18* (2006.01)
(52) U.S. Cl. ...................................... 702/181
(58) Field of Classification Search ................... 702/181
See application file for complete search history.

(56) References Cited

OTHER PUBLICATIONS

Cristiano Niclass, A 128×128 Single-Photon Image Sensor With Column-Level 10-Bit Time-to-Digital Converter Array, IEEE Journal of Solid-State Circuits, vol. 43, No. 12, Dec. 2008, p. 2977-2989.*
. B. F. Levine, D. G. Bethea, and J. C. Campbell, "Near room temperature 1.3 um single photon counting with a InGaAs avalanche photodiode," Electron. Lett. 20(14), 596-598 (1984).
D. Stucki, G. Ribordy, A. Stefanov, H. Zbinden, J. G. Rarity, and T. Wall, "Photon counting for quantum key distribution with Peltier cooled InGaAs/InP APD's," J. Mod. Opt. 48(13), 1967-1981 (2001).
M. Wegmuller, F. Scholder, and N. Gisin, "Photon counting OTDR for Local Birefringence and Fault Analysis in the Metro Environment," J. Lightwave Technol. 22(2), 390-400 (2004).
D. S. Bethune, W. P. Risk, and G. W. Pabst, "A high performance integrated single photon detector for telecom wavelengths," J. Mod. Opt. 51, 1359-1368 (2004).
A. Yoshizawa, R. Kaji, and H. Tsuchida, "Quantum efficiency evaluation method for gated-mode single photon detector," Electron. Lett. 38(23), 1468-1469 (2002).
M. A. Itzler, R. Ben-Michael, C. F. Hsu, K. Slomkowski, A. Tosi, S. Cova, F. Zappa, and R. Ispasoiu, "Single photon avalanche diodes (SPADs) for 1.5 um photon counting applications," J. Mod. Opt. 54(2), 283-304 (2007).
X. Jiang, M. A. Itzler, R. Ben-Michael, and K. Slomkowski, "InGaAsP-InP avalanche photodiodes for single photon detection," IEEE J. Sel. Top. Quantum Electron. 13(4), 895-905 (2007).
Y. Kang, H. X. Lu, Y.-H. Lo, D. S. Bethune, and W. P. Risk, "Dark count probability and quantum efficiency of avalanche photodiodes for single-photon detection," Appl. Phys. Lett. 83(14), 2955 (2003).
J. Zhang, R. Thew, J. D. Gautier, N. Gisin, and H. Zbinden, "Comprehensive characterization of InGaAs/InP avalanche photodiodes at 1550 nm with an active quenching ASIC," IEEE J. Quantum Electron. 45(7), 792-799 (2009).
S. V. Polyakov, and A. L. Migdall, "High accuracy verification of a correlated-photon-based method for determining photoncounting detection efficiency," Opt. Express 15(4), 1390-1407 (2007), http://www.opticsinfobase.org/oe/abstract.cfm?URI=oe-15-4-1390.

* cited by examiner

*Primary Examiner* — Tung S Lau

(57) ABSTRACT

Operational parameters of a single-photon detector are determined with a source of photon pairs. At a fixed trigger, a dark count probability and a series of count probabilities at different optical powers are determined. A particular optical power is selected by adjusting the optical power of the source of photon pairs. The dark count probability and the count probabilities are determined for different trigger rates. The operational parameters include efficiency, afterpulsing constant, and detrap time. The operational parameters are computed by fitting the computed dark count probabilities and count probabilities to a user-defined relationship.

2 Claims, 12 Drawing Sheets

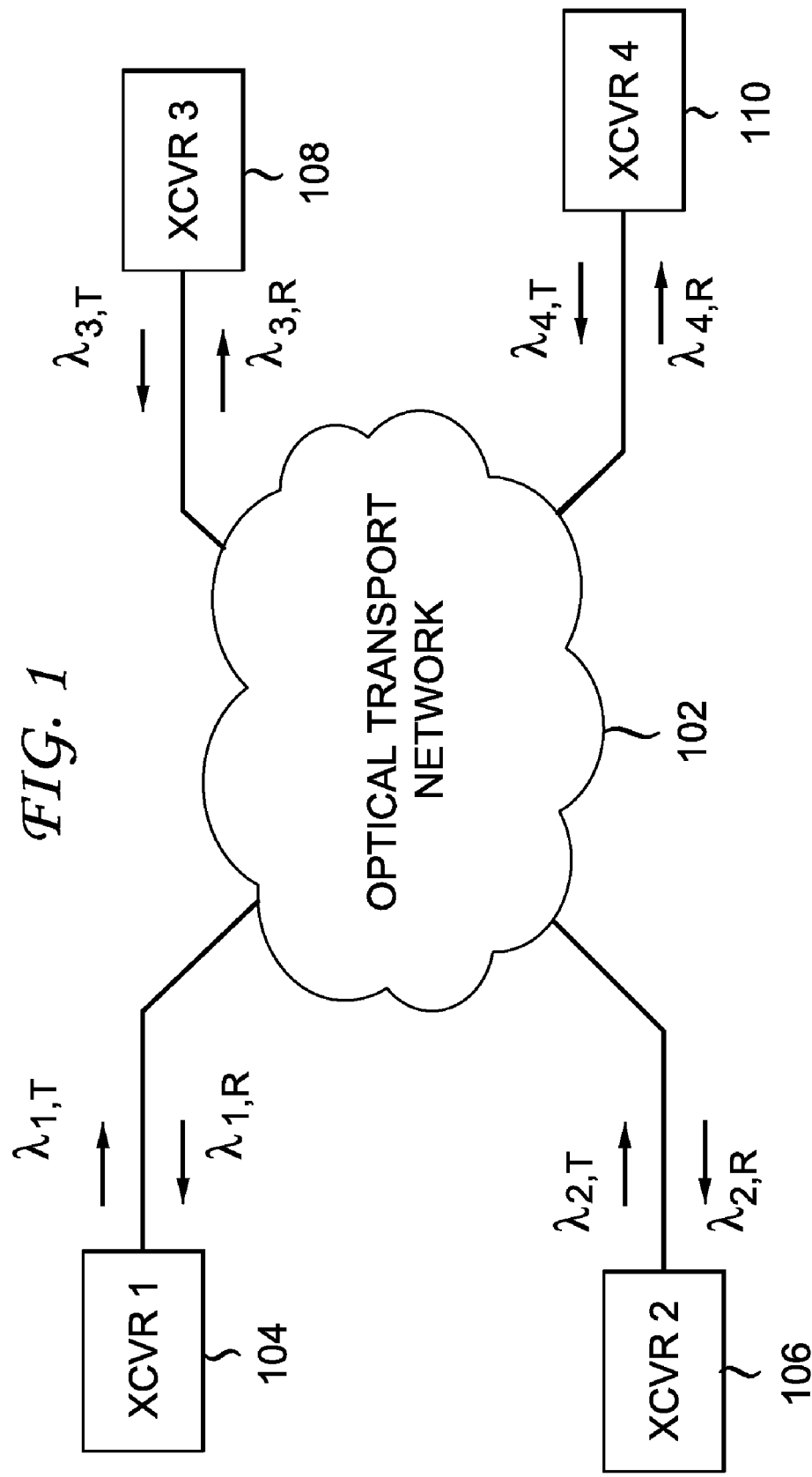

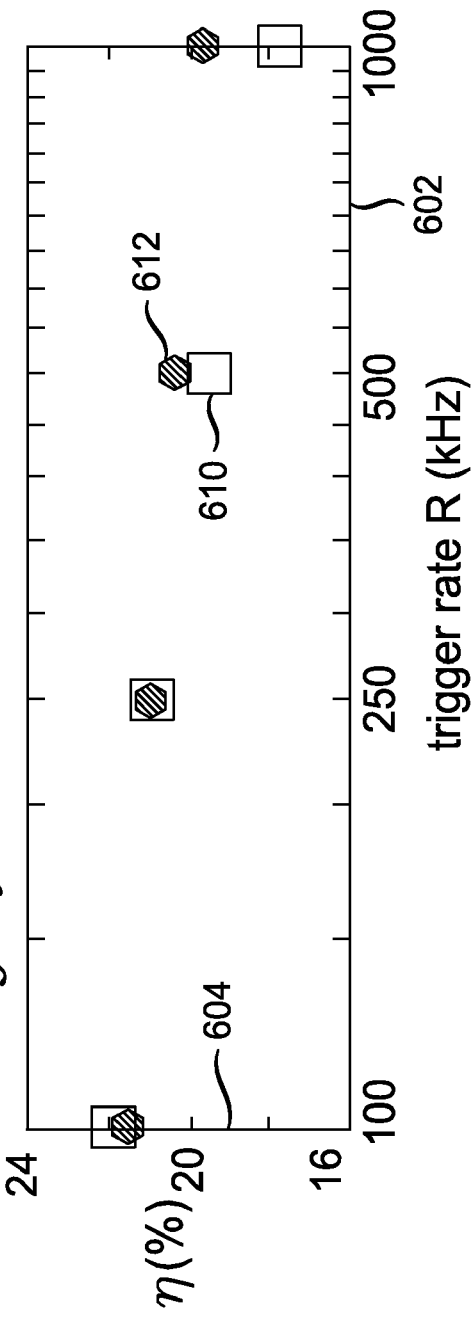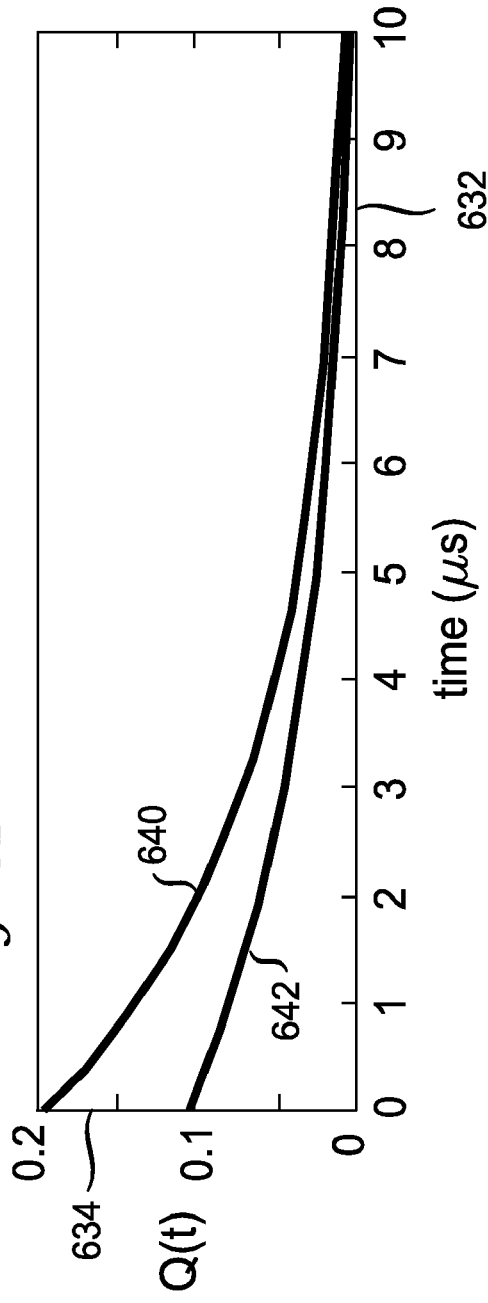

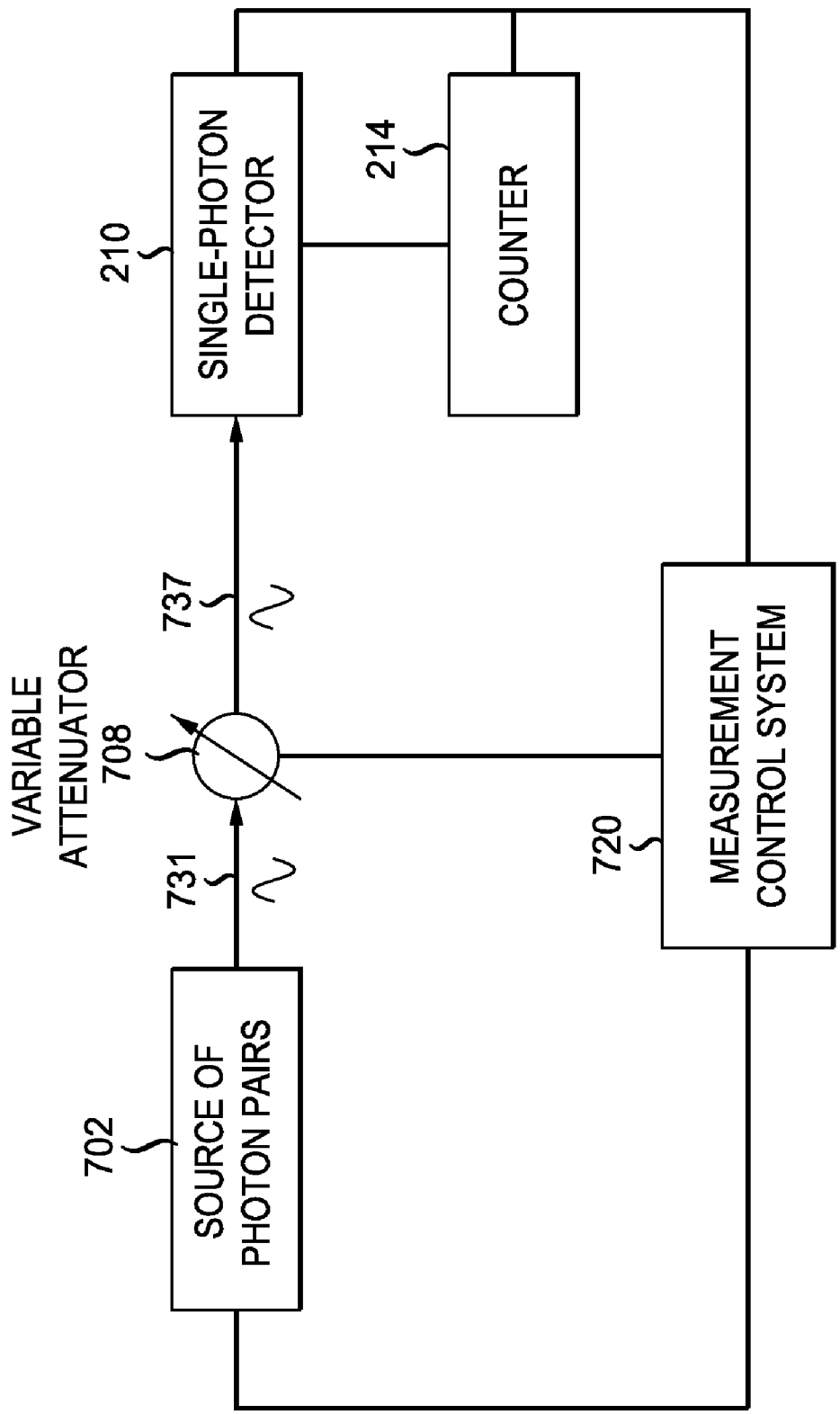

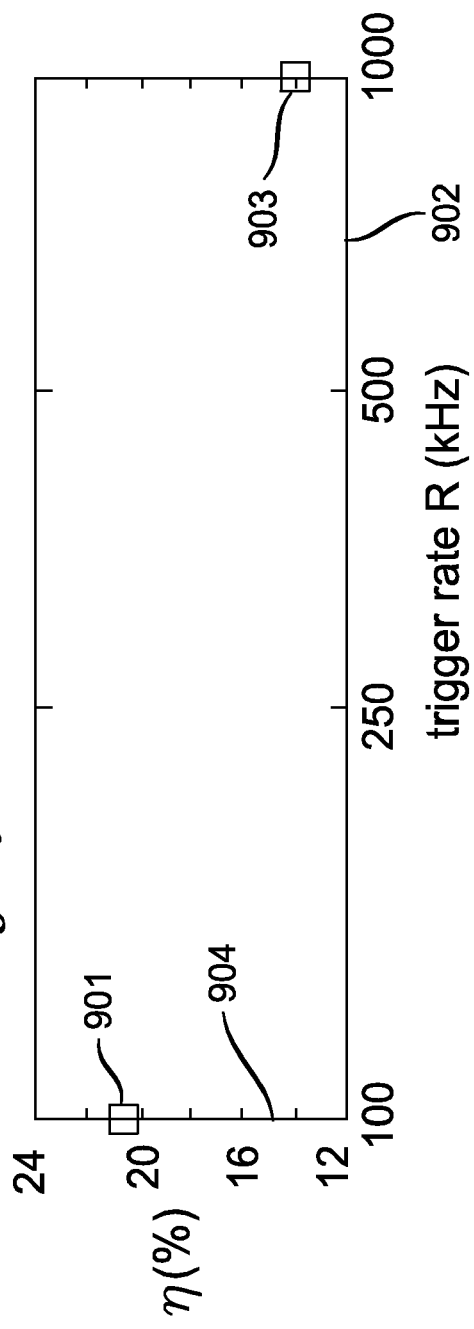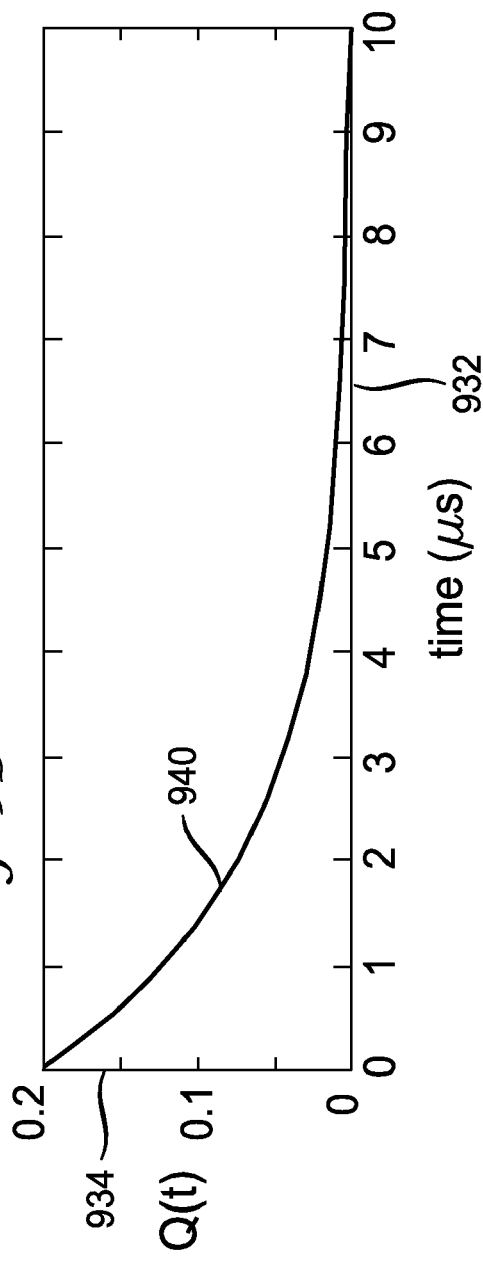

US 8,285,515 B2

CHARACTERIZATION OF SINGLE-PHOTON DETECTORS USING A SOURCE OF PHOTON PAIRS

CROSS-REFERENCE TO RELATED APPLICATION

This application is related to U.S. patent application Ser. No. 12/834,956, entitled Characterization of Single-Photon Detectors Using a Continuous Wave Laser Source, which is being filed concurrently herewith and which is herein incorporated by reference in its entirety.

BACKGROUND

The present disclosure relates generally to optical detectors, and more particularly to characterization of single-photon detectors using a source of photon pairs.

An optical detector that has a sufficiently high detection sensitivity that it can detect a single photon is referred to as a single-photon detector (SPD). Single-photon detectors operating over various ranges of wavelengths have been used for various applications, including ultrahigh resolution optical time domain reflectometry, photon-correlation spectroscopy, and device characterization. At present, there is particularly strong interest in the application of SPDs for optical telecommunications. One method for high-security transmission over an optical telecommunications network is quantum cryptography, which utilizes quantum key distribution via single photons. Fiberoptic transport networks typically operate over a wavelength range of ~1.3-1.6 µm. Over this wavelength range, single-photon detectors are typically based on avalanche photodiodes (APDs) fabricated from InP/InGaAs/InGaAsP heterostructures.

A critical performance parameter characterizing an SPD is its detector efficiency. For optical telecommunications, SPDs typically have a low detector efficiency (~10-30%); furthermore, the detector efficiency drifts with time. Current methods for measuring the detector efficiency of SPDs use complicated timing control schemes and ultralow input power levels. Current measurement equipment is typically bulky and expensive, including electronic time delays, pulsed lasers, high dynamic range attenuators, and high sensitivity power meters. What is needed is a simple, low-cost, compact system for measuring the detector efficiency, and other characteristics, of a single-photon detector.

BRIEF SUMMARY

Operational parameters of a single-photon detector are determined with a source of photon pairs. For each trigger rate selected from a plurality of trigger rates, a dark count probability is computed from recorded dark counts, and a plurality of count probabilities are computed from recorded counts. Each particular count probability is determined from a particular optical power selected from a plurality of optical powers. The operational parameters include efficiency, afterpulsing constant, and detrap time. The operational parameters are computed by fitting the computed dark count probabilities and count probabilities to a user-defined relationship.

These and other advantages of the disclosure will be apparent to those of ordinary skill in the art by reference to the following detailed description and the accompanying drawings.

BRIEF DESCRIPTION OF THE DRAWINGS

FIG. 1 shows a schematic of a generic optical telecommunications system;

FIG. 6A shows plots of detector efficiency for a continuous wave laser source as a function of function of the average number of photons per detector gate for different values of trigger rate;

FIG. 6B shows plots of afterpulse parameter for a continuous wave laser source as a function of time;

FIG. 7A shows a schematic of a field measurement system with a source of photon pairs for measuring the operational parameters of a single-photon detector;

FIG. 9A shows plots of detector efficiency for a source of photon pairs as a function of function of the average number of photons per detector gate for different values of trigger rate;

FIG. 9B shows plots of afterpulse parameter for a source of photon pairs as a function of time;

DETAILED DESCRIPTION

FIG. 1 shows a schematic of a generic optical telecommunications system. Multiple optical transceivers (XCVRs) send and receive lightwave signals via optical transport network 102 (such as a fiberoptic network). Shown are four representative transceivers, referenced as XCVR 1 104, XCVR 2 106, XCVR 3 108, and XCVR 4 110, respectively. The receivers in the transceivers include single-photon detectors (SPDs). Each transceiver has a corresponding transmit wavelength ($\lambda_{n,T}$) and a corresponding receive wavelength ($\lambda_{n,R}$), where n=1-4.

Figure 2A:
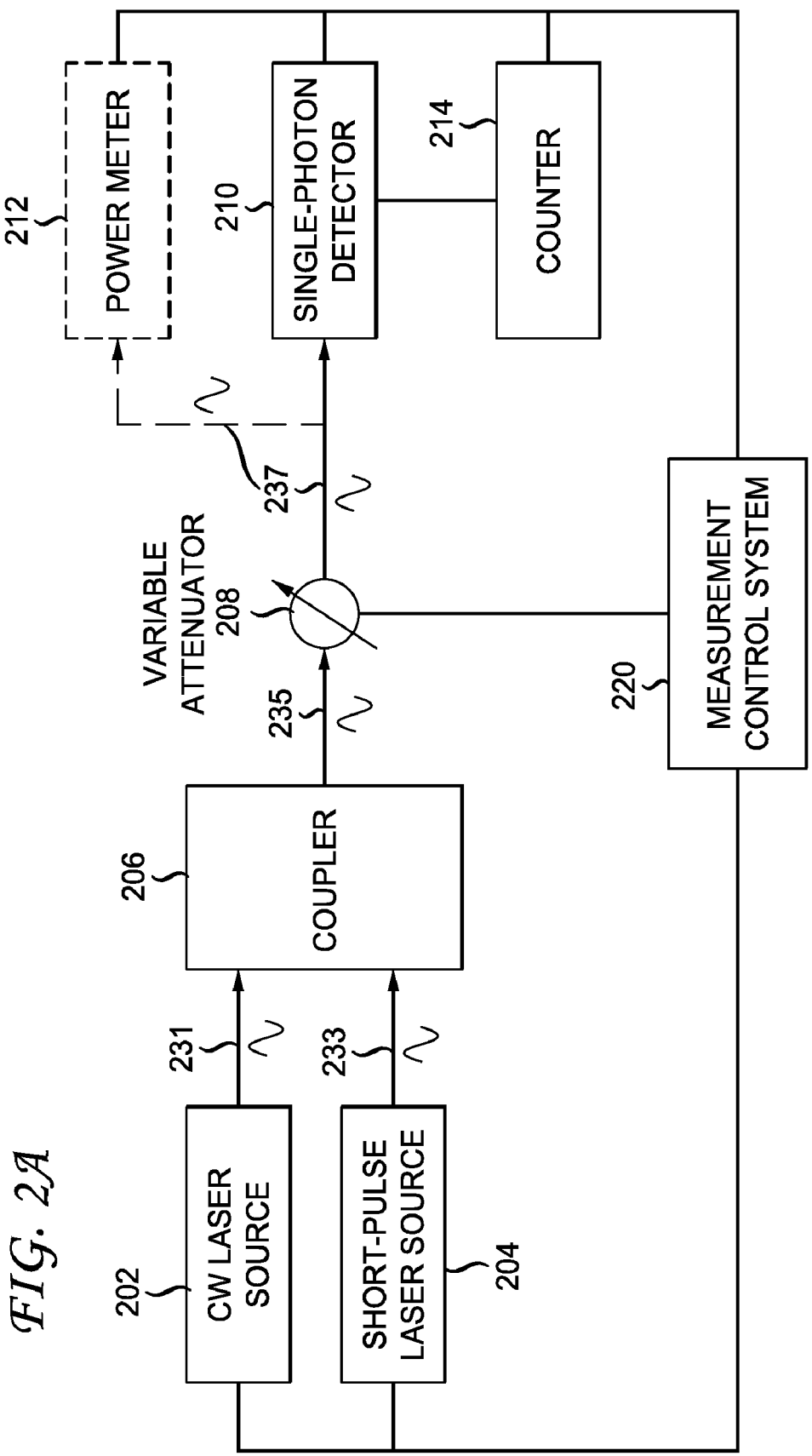
FIG. 2A shows a schematic of a measurement system, including a continuous wave laser source and a reference pulse laser source and a power meter, for measuring the operational parameters of a single-photon detector.

FIG. 2A shows a dual-mode measurement system for measuring the operational parameters of a single-photon detector. The measurement system can compare measurements using a short-pulse laser source with measurements using a continuous wave (CW) laser source. Continuous wave laser source 202 transmits optical beam 231, and short-pulse laser source 204 transmits optical beam 233. Optical beam 231 and optical beam 233 are transmitted to coupler 206 [for example, an equal-intensity (50:50) coupler]. The output of coupler 206 is optical beam 235, which is transmitted through variable attenuator 208. The output of variable attenuator 208 is transmitted as optical beam 237 to single-photon detector 210, or, alternatively, to power meter 212. The electronic charge pulses from the output of single-photon detector 210 are detected and counted by counter 214. The operations of CW laser source 202, short-pulse laser source 204, variable attenuator 208, single-photon detector 210, counter 214, and power meter 212 are controlled by measurement control system 220. Various elements of the measurement system can also be manually controlled by a user.

In the example shown in FIG. 2A, the transport medium is optical fiber, and the wavelength of all the optical beams (optical beam 231-optical beam 237) is $\lambda=1.55$ µm. As discussed above, SPDs for wavelengths used in optical telecommunications are typically based on an avalanche photodiode (APD). Operation of an APD is a function of the reverse bias voltage applied across the APD. When the bias voltage exceeds the breakdown voltage, an incident photon can initiate a carrier avalanche, resulting in a charge pulse that can be electronically detected. A carrier avalanche can also be initiated by a source other than an incident photon (such as a trapped charge or a phonon). These other sources can generate background counts, resulting in background noise.

Figure 3:
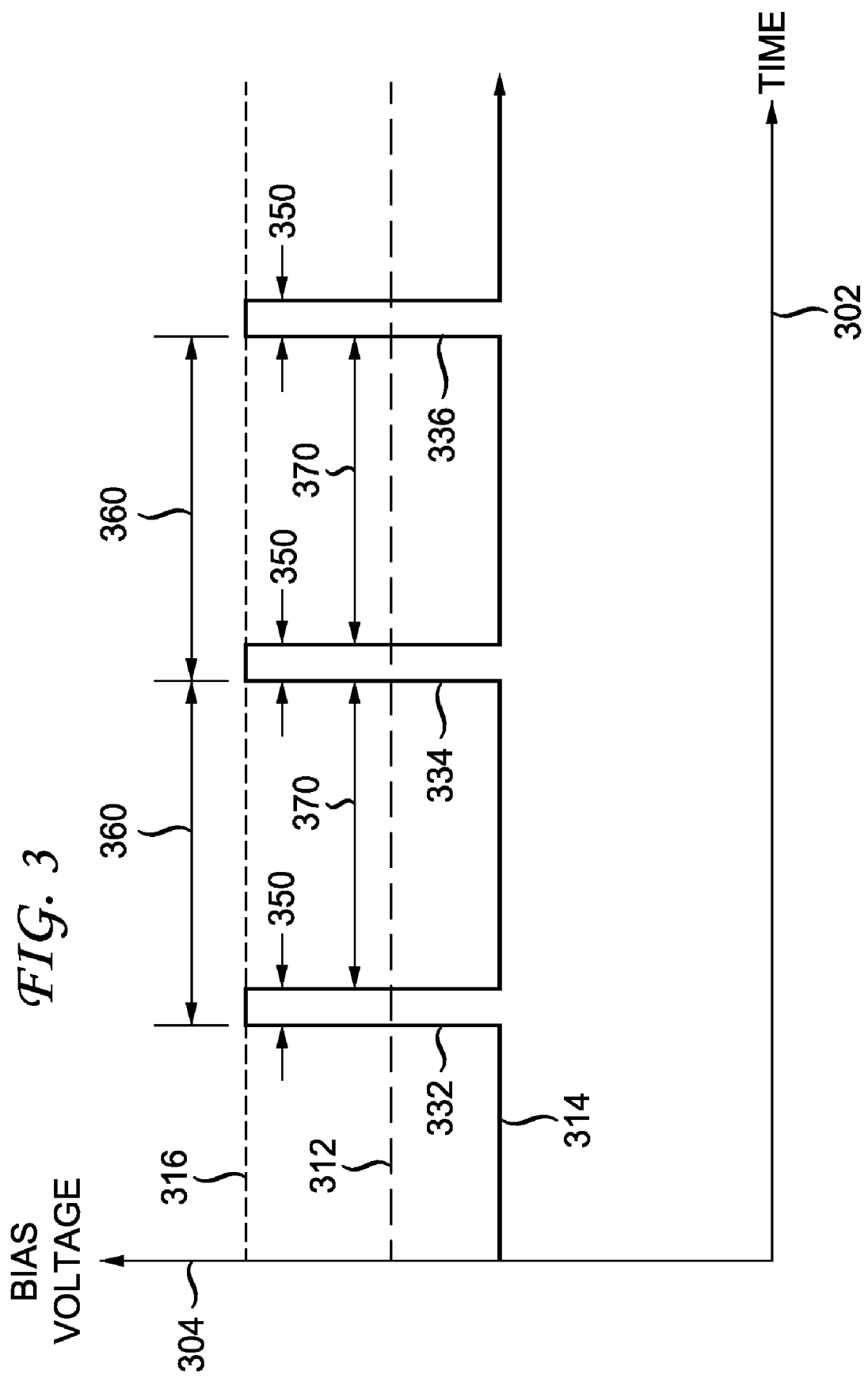
FIG. 3 shows bias pulses applied to a single-photon detector.

To reduce background noise, an APD can be operated in a gated mode, as shown in FIG. 3. The horizontal axis 302 represents time, and the vertical axis 304 represents bias voltage. Shown are three reference voltages: reference voltage 312 is the breakdown voltage; reference voltage 314, below the breakdown voltage, is the pulse baseline voltage; and reference voltage 316, above the breakdown voltage, is the pulse peak voltage. The bias voltage is modulated by a periodic sequence of pulses (shown as ideal rectangular pulses), referred to as bias pulses (also referred to as gate pulses). Shown are three representative bias pulses: bias pulse 332, bias pulse 334, and bias pulse 336. The amplitude of the bias pulses ranges from the pulse baseline voltage 314 to the pulse peak voltage 316. The pulse width (also referred to as the gate window) is referenced as pulse width 350. The period between pulses is referenced as period 360. The inverse of the period between pulses is referred to as the trigger rate. The interval delimited by the end of one pulse and the start of another pulse is referenced as afterpulse interval 370.

During a bias pulse, the bias voltage is greater than the breakdown voltage, and an incident photon can initiate a carrier avalanche that results in a charge pulse that can be electronically detected. During an afterpulse interval, the bias voltage is less than the bias voltage. The charge state of the APD, however, does not relax instantaneously. During an afterpulse interval, an incident photon can still trigger a carrier avalanche, resulting in a detected signal. In addition, as discussed above, even in the absence of incident photons (dark conditions), other sources can trigger carrier avalanches, resulting in dark counts. Dark counts are dependent on the temperature of the SPD. If the incident photons are generated by a pulsed laser source that is synchronized with the bias pulses, the effects of non-photon induced carrier avalanches can be reduced. For characterization of commercial SPDs, a pulsed laser source at ultralow powers is typically used. In an embodiment, a CW laser source at relatively higher powers is used.

Return to FIG. 2A. Short-pulse laser source 204, used for reference measurements, emits optical pulses with an optical pulse width of ~30 ps; the short-pulse laser source 204 is synchronized with the single-photon detector 210. Variable attenuator 208 is a double-stage variable attenuator with a total range of 85 dB. Each stage is calibrated independently at relatively high input power levels of ~50 dBm by using the power meter 212. The calibration enables precise control of the power at levels below the sensitivity of the power meter 212. By adjusting variable attenuator 208, the average number of photons per detector gate (average number of photons per measurement interval), µ, is adjusted down to 0.02 for both the CW laser source 202 and the short-pulse laser source 204. For each detection event, single-photon detector 210 generates an electrical Nuclear Instrumentation Module Standard (NIM) pulse. The NIM pulses are integrated by electronic counter 214.

To determine the average number of photons per detector gate in the CW regime, the effective gate window of the detector $\tau_g$ is measured. During each counting cycle, a 1-ns-wide electrical bias pulse brings the APD above the breakdown voltage. Conventionally, the maximum efficiency $\eta_0$ achieved at the peak of the bias pulse is measured with a properly aligned narrow optical pulse and serves as the major specification for commercial SPDs. With a CW laser source, however, the efficiency changes during the duration of the bias pulse in a non-linear fashion. To simplify calculations, an SPD is modelled in the CW regime as operating at its maximum efficiency value $\eta_0$ for an effective gate window $\tau_g$. To determine $\tau_g$ experimentally, the probability of a count $P_c$ is measured over a wide power range for both CW and pulsed lasers at a fixed trigger rate R. In the discussion below, R=100 kHz; however, other trigger rates can be used as well. The values of the CW laser power $P_{cw}$ and the average pulsed laser power $P_p$ are then selected such that the corresponding count probabilities are equal: $P_c(P_{cw})=P_c(P_p)$. The effective gate window is then calculated as $\tau_g=10^{(P_p-P_{cw}-10\log_{10}(R))/10}$ where the power values are measured in dBm. When averaged over the entire power range, $\tau_g$ is observed to fall in a range of 0.49 ns-0.59 ns for various commercial SPDs.

Figure 4:
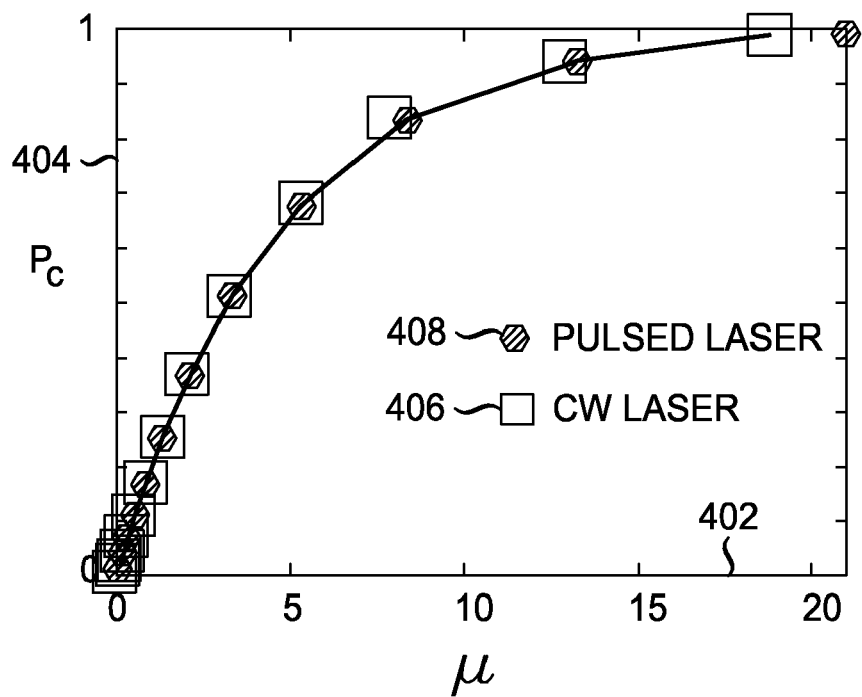
FIG. 4 shows plots of probability count as a function of the average number of photons per detector gate.

FIG. 4 shows plots of the measured count probability as a function of the average number of photons per detector gate. The horizontal axis 402 represents the average number of photons per detector gate, µ. The vertical axis 404 represents the measured count probability, $P_c$. The open squares 406 show the results for CW laser source 202, and the filled dots 408 show the results for short-pulse laser source 204. More specifically, the plots show the measured count probabilities $P_c(\mu)$ as a function of the average number of photons per detector gate $\mu_{cw}$ for CW laser source 202 and as a function of the average number of photons per detector gate $\mu_p$ for short-pulse laser source 204, where $$\mu_{cw} = \frac{10^{(P_{cw}/10)}}{1000 \times h \times v} \times \tau_g \text{ and } \mu_p = \frac{10^{(P_p/10)}}{1000 \times h \times v \times R}.$$

Here h is Planck's constant and $v=1/\lambda$ is the optical frequency. When $\tau_g=0.49$ ns, the measured count probabilities in the CW and the pulsed case are equal.

The dependence shown in FIG. 4 saturates because avalanche SPDs are not sensitive to the number of registered photons (a registered photon is a photon that sets off an avalanche). For Poissonian photon statistics, this saturation was first described by B. F. Levine et al. ("Near room temperature 1.3 µm single photon counting with a InGaAs avalanche photodiode," *Electron Lett.*, vol. 20, no. 14, pp. 596-598, July 1984) by the expression:

$$P_c=1-(1-P_{dc})\times\exp(-\mu\eta), \tag{E1}$$

where $P_{dc}$ is the probability of a dark count, µ is the average number of photons per detector gate, and $\eta$ is the detector efficiency. The measured data, however, deviates from the dependence in (E1) in two ways. First, the measured count probability is found to be somewhat higher at lower µ values; this result suggests the presence of afterpulses, as described by M. A. Itzler et al. ("Single photon avalanche diodes (SPADs) for 1.5 µm photon counting applications," *J. Mod.*

*Opt.*, vol. 54, no. 2-3, pp. 283-304, February 2007) and X. Jiang et al. ("InGaAsP—InP avalanche photodiodes for single photon detection," *IEEE Journal of Selected Topics in Quantum Electronics*, vol. 13, no. 4, pp. 895-905, August 2007). Second, the entire curve seems to be shifted toward higher, μ; this result indicates a slight decrease in efficiency. These two effects become more pronounced with higher trigger rates. These deviations due to the afterpulsing effect are accounted for by modifying the expression for the count probability (see below).

The afterpulsing effect is characterized by the conditional probability Q(t) of having an avalanche for the detector gate being open after a time interval t since a successful detection event. It is assumed that this conditional probability decays exponentially with a time constant $$\tau: Q(t) = Q_0 \exp(-t/\tau),$$

where $Q_0$ is referred to as the afterpulsing constant, and $\tau$ is referred to as the detrap time. Then $Q_n$ is the conditional probability of the avalanche occurrence after exactly n clock cycles in the detector that is gated with the trigger rate R:

$$Q_n = Q_0 \exp(-n/R\tau). \tag{E2}$$

Within this model, the overall probability of a registered event (count probability) $P_c$ is found to be determined by the relationship:

$$P_c = P1\{\bullet\} + \frac{1}{2}\sqrt{P2\{\bullet\} + P3\{\bullet\}}, \tag{E3}$$

where $$P1\{\bullet\} = \frac{2 - e^{1/R\tau} - (1-P_{dc})(1-P_{ph})(1-Q_0)}{2},$$

$$P2\{\bullet\} = [2 - e^{1/R\tau} - (1-P_{dc})(1-P_{ph})(1-Q_0)]^2, \text{ and}$$

$$P3\{\bullet\} = 4(e^{1/R\tau} - 1)[1 - (1-P_{dc})(1-P_{ph})].$$

Here, $P_{ph}$ is the probability of detecting photons generated by the specific source in the absence of both dark counts and afterpulses. For a Poissonian source of single photons, such as attenuated coherent laser light corresponding to optical beam 237, $$P_{ph} = 1 - \exp(-\mu\eta). \tag{E4A}$$

For a Poissonian source of photon pairs, such as produced by a source of photon pairs 702, discussed below, $$P_h = 1 - \exp(-\mu\eta(2-\eta)). \tag{E4B}$$

For $Q_0 \to 0$ or $\tau \to 0$, (E3) Reduces to the More Simple Form (E1).

The derivation of (E3) is accomplished in two steps. The first step consists of evaluating the marginal probability of an afterpulse $P_{ap}$:

$$P_{ap}^{(n)} = P_c^{(n-1)}Q_1(1-P_c^{(n-1)})P_c^{(n-2)}Q_2 + (1-P_c^{(n-1)})(1-P_c^{(n-2)})P_c^{(n-3)}Q_3+, \tag{E5}$$

where the superscript n denotes that the corresponding probability is evaluated at the n-th time interval. Note that $Q_k$ is a conditional probability of an afterpulse given that no counts occurs during the time t=k/R.

Substitution of (E2) into (E5) yields:

$$P_{ap}^{(n)} = P_c^{(n-1)}Q_1 P_{ap}^{(n-1)}(1-P_c^{(n-1)})Q_1/Q_o \tag{E6}$$

After a sufficiently long measurement time (sufficiently large number of trigger cycles), the probabilities $P_{ap}^{(n)}$ and $P_c^{(n)}$ reach their stationary values and can be replaced by $P_{ap}$ and $P_c$, respectively, in (E6), which is then solved for $P_{ap}$:

$$P_{ap} = \frac{P_c Q_1}{1 - (1-P_c)Q_1/Q_0}. \tag{E7}$$

The second step of the derivation consists of extracting $P_c$ from $P_c = 1-(1-P_{dc})(1-P_{ph})(1-P_{ap})$, where $P_{ap}$ is given by (E7). For $Q_0 \to 0$ or $\tau \to 0$ (that is, $Q_1 \to 0$), (E7) yields $P_{ap}=0$. Therefore, $P_c$, as evaluated from $P_c=1-(1-P_{dc})(1-P_{ph})$, reduces to the simple form given in (E1).

Figure 5:
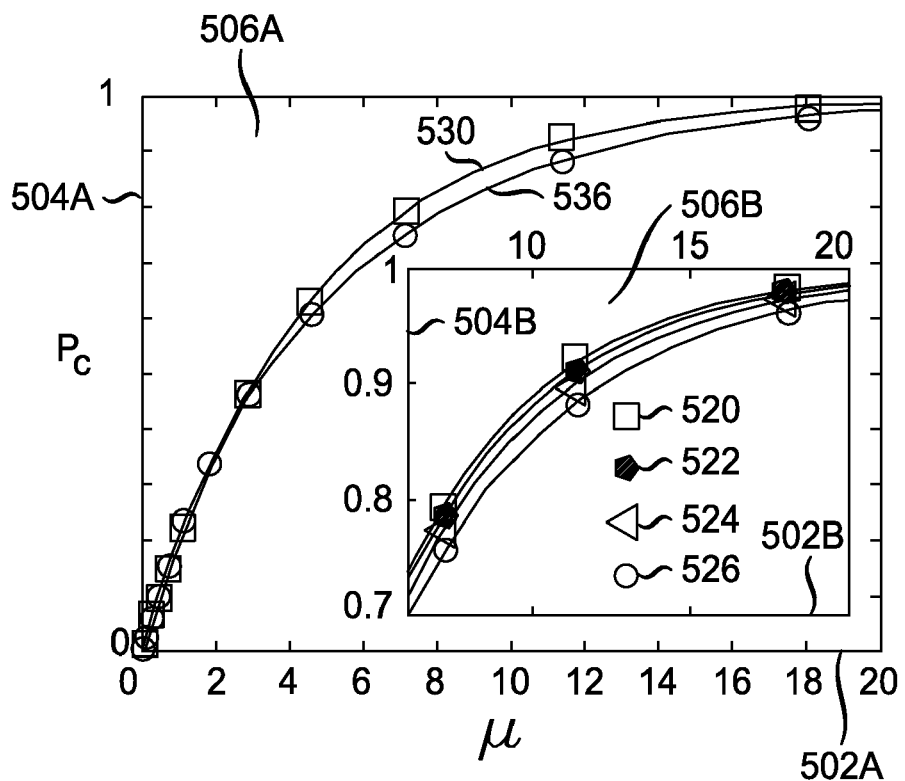
FIG. 5 shows plots of probability count for a continuous wave laser source and a pulsed laser source as a function of the average number of photons per detector gate at a fixed trigger rate.

FIG. 5 shows plots of the measured count probability for a CW laser as a function of average number of photons per detector gate at different trigger rates, over a range of approximately 100 kHz to 1 MHz. A different range can be used, depending on the detector. To show sufficient detail, two sets of plots are shown: set 506A in the principal field, and set 506B in the inset. The horizontal axes, horizontal axis 502A and horizontal axis 502B, represent the average number of photons per detector gate, $$\mu_{cw} = \frac{10^{(P_{cw}/10)}}{1000 \times h \times v} \times \tau_g,$$

over the range from 0.1 to 20. The data is taken at four different trigger rates (R): data points 520, data points 522, data points 524, and data points 526 correspond to measured values for R=100 kHz, 250 kHz, 500 kHz, and 1 MHz, respectively. As discussed below, the plotted lines correspond to fitted curves.

As discussed above, for each trigger rate R, the dependence of $P_c$ on $\mu_{cw}$ can be described by (E3), computed with the corresponding values of R. The following operational parameters of the detector can then be extracted by fitting (E3) to the experimental data: the efficiency for each trigger rate η(R), the afterpulsing constant $Q_0$, and the detrap time $\tau$.

The rate dependent dark count probability $P_{dc}$ is first measured. Then a simultaneous fit is performed for all four experimentally obtained dependencies of the count probability on the average photon number per detector gate. By inserting the resulting parameters back into (E3), fitted plots can be made. Two full-range representative fitted plots (corresponding to the low end and the high end of the range of trigger rates) are shown in set 506A of FIG. 5: fitted plot 530 corresponding to R=100 kHz and fitted plot 536 corresponding to R=1 MHz. The high quality of the fits can be clearly seen. By using only a limited range of $\mu_{cw}$=3-20 (corresponding to an easily measurable interval of −61 dBm≦$P_{cw}$≦−53 dBm) a nearly perfect match is obtained for the data within a rms deviation of $3\times10^{-4}$. Therefore, the operational parameters of the detector can be extracted from measured photon counts at a relatively high number of incident photons.

FIG. 6A shows plots of the extracted detector efficiency as a function of trigger rate. The horizontal axis 602 represents the trigger rate R (kHz). The vertical axis 604 represents the extracted detector efficiency η (%). Points 610 (open squares) show the values for a CW laser source at relatively high powers; points 612 (filled dots) show the values for a pulsed laser source at relatively high powers. For low trigger rates R=100 kHz and R=250 kHz, the CW laser source and the pulsed laser source yield nearly identical results. At R=250 kHz, the measured efficiency is 21%, which is in close agreement with the manufacturer's specification of 20%. The data indicates that the efficiency drops with trigger rate. The drop is more pronounced for a CW laser source, resulting in a 2% deviation from the value of 19.7% measured with a pulsed laser source at R=1 MHz.

The observed trends in the efficiency are also reflected in the afterpulsing probabilities, as shown in the plots in FIG. 6B. The horizontal axis 632 represents time (µS). The vertical axis 634 represents $$Q(t) = Q_0 \exp(-t/\tau),$$

with the afterpulsing constant $Q_0$ and the detrap time $\tau$ extracted from the fits. Plot 640 shows the results for a CW laser source; plot 642 shows the results for a pulsed laser source. The CW laser source and the pulsed laser source yield similar results for times greater than 4-5 µS, that is, corresponding to trigger rates less than 200-250 kHz. For small time values, the afterpulsing effect for a CW laser source grows significantly. The CW detrap time $\tau_{cw} \approx 2.5$-$3.0$ µS appears to be slightly smaller than the values obtained for the pulsed laser source, $\tau_{pulsed} \approx 4.0$-$5.0$ µs, which are more consistent with the values reported by the device manufacturers. One possible reason for this discrepancy is that the relaxation in the CW regime might be a combination of several processes beyond afterpulsing; the other processes, for example, might be the charge persistence or twilight effect as being dominant for small time values for a CW laser source (see J. Zhang et al., "Comprehensive characterization of InGaAs/InP avalanche photodiodes at 1550 nm with an active quenching ASIC," *IEEE J. Quantum Electron.*, vol. 45, Issue 7, pp. 792-799, July 2009, and S. V. Polyakov and A. L. Migdall, "High accuracy verification of a correlated photon-based method for determining Photon counting detection efficiency", *Optics Express*, vol. 15, No. 4, pp. 1390-1407, February 2007).

Figure 2B:
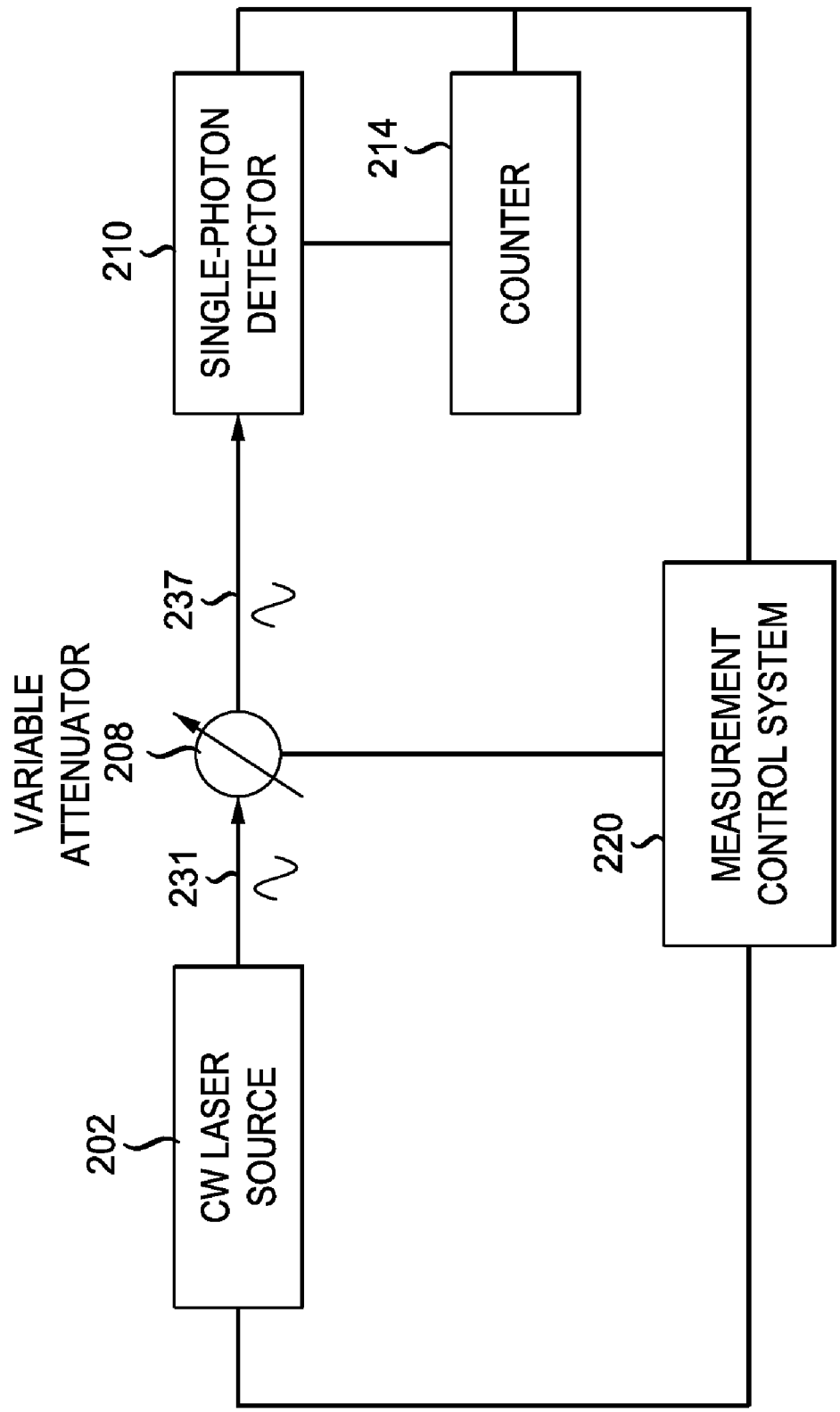
FIG. 2B shows a schematic of a field measurement system with a continuous wave laser source for measuring the operational parameters of a single-photon detector.

An embodiment of a measurement system for characterizing the operational parameters of a single-photon detector is shown in FIG. 2B. It is similar to the measurement system in FIG. 2A, except the components used in FIG. 2A for initial calibration of the variable attenuator, comparison with a reference pulsed laser source, and determination of the effective gate window, are no longer present. Note that the effective gate window is a parameter that can also be reported by the detector manufacturer. In one embodiment, the SPD under test is decoupled from its normal operating network connection (see FIG. 1) and coupled to the measurement system. As described above with reference to FIG. 2A, continuous wave laser source 202 transmits optical beam 231 through variable attenuator 208. The output of variable attenuator 208, optical beam 237, is transmitted to single-photon detector 210. The electronic charge pulses from the output of single-photon detector 210 are detected and counted by counter 214. Measurement control system 220 controls the operation of CW laser source 202, variable attenuator 208, single-photon detector 210, and counter 214.

FIG. 7A shows another embodiment of a measurement system for characterizing the operational parameters of a single-photon detector. The measurement system uses a source of photon pairs, common in quantum cryptography systems. For applications in which single-photon detectors are used in quantum cryptography systems, it is advantageous to use a source of photon pairs for the optical source in a measurement system. A source of photon pairs 702 transmits optical beam 731 to variable attenuator 708. The output of variable attenuator 708 is transmitted as optical beam 737 to single-photon detector 210. As discussed above, the electronic charge pulses from the output of single-photon detector 210 are detected and counted by counter 214. The operations of the source of photon pairs 702, variable attenuator 708, single-photon detector 210, and counter 214 are controlled by measurement control system 720. Various elements of the measurement system can also be manually controlled by a user.

Since the output power of the source of photon pairs 702 is generally much lower than that of CW laser source 202 (FIG. 2A), the dynamic range of variable attenuator 708 (~10-30 dB) does not need to be as wide as that of attenuator 208 (85 dB in the example discussed above). In other embodiments, variable attenuator 708 is not used, and the output power of the source of photon pairs 702 can be adjusted by other means, as discussed below.

Figure 7B:
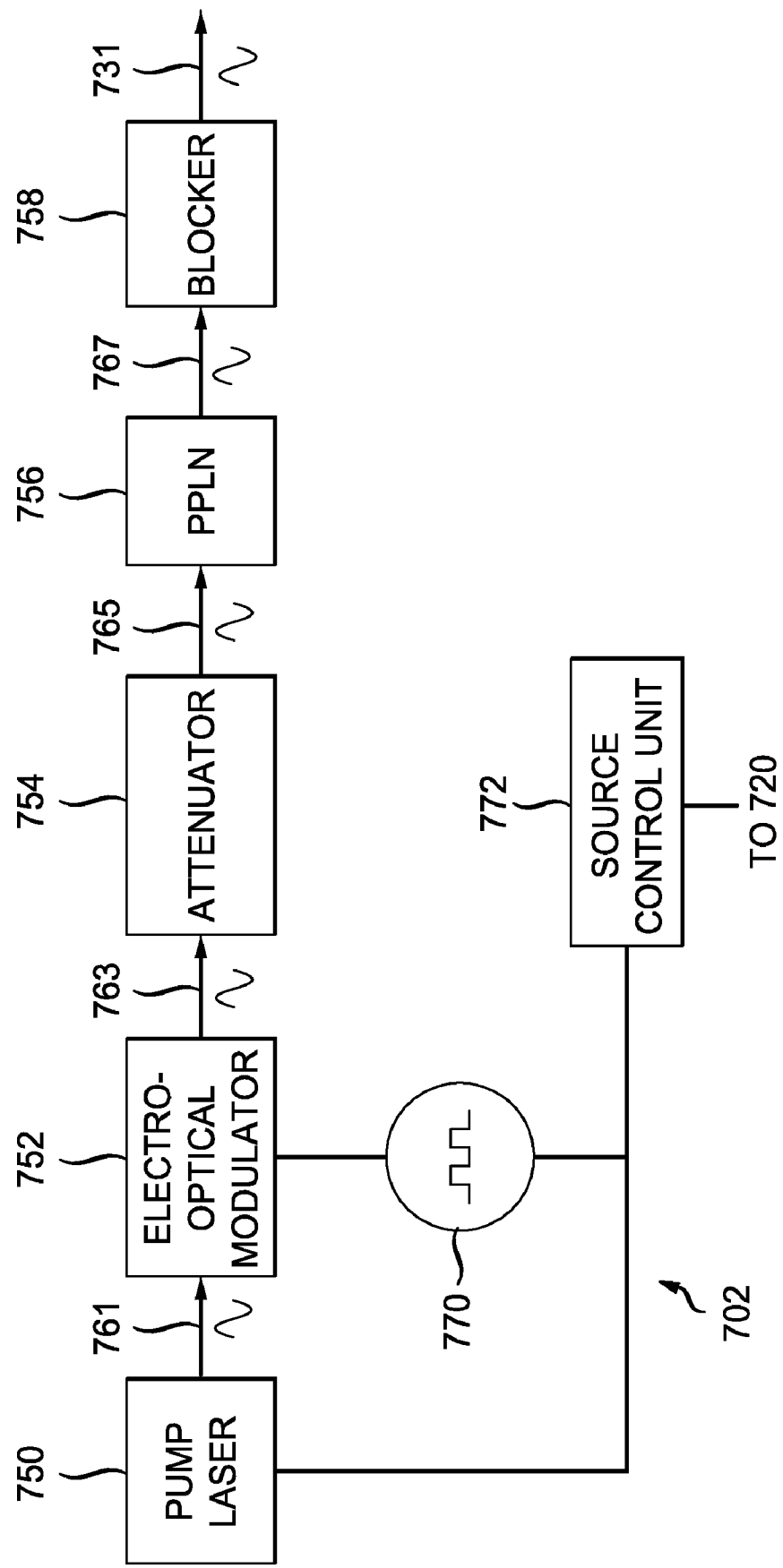
FIG. 7B shows a schematic of a source of photon pairs.

FIG. 7B shows an embodiment of source of photon pairs 702. Pump laser 750, operating in a continuous-wave (CW) mode, transmits optical beam 761 to electro-optical modulator 752. Pump laser 750 is a semiconductor Fabry-Perot (FP) laser emitting optical beam 761 with a wavelength of $\lambda$=0.775 µm. Electro-optical modulator 752 is a lithium niobate electro-optical modulator driven by clock pulses (1 MHz) from clock generator 770. Pump laser 750 and clock generator 770 are controlled by source control unit 772, which is interfaced with the overall measurement control system 720 (FIG. 7A).

The output of electro-optical modulator 752 is modulated optical beam 763, which is transmitted to attenuator 754. The output of attenuator 754 is optical beam 765, which is transmitted to a periodically poled lithium niobate (PPLN) waveguide 756. In response to the pump laser light at a wavelength of $\lambda$=0.775 µm (optical beam 765), PPLN waveguide 756 emits photon pairs at a wavelength of $\lambda$=1.55 µm. The output of PPLN waveguide 756 is optical beam 767 which includes the photon pairs at a wavelength of $\lambda$=1.55 µm and pump laser light at a wavelength of $\lambda$=0.775 µm. Optical beam 767 is transmitted to blocker 758, which blocks the pump laser light at a wavelength of $\lambda$=0.775 µm. The output of blocker 758 is optical beam 731, which transmits the photon pairs at a wavelength of $\lambda$=1.55 µm. The output power of optical beam 731 can be varied by various means; for example, by varying the output power of optical beam 761 transmitted from pump laser 750.

For characterizing the operational parameters of a single-photon detector using a source of photon pairs, an analysis similar to that described above with respect to a continuous wave laser source can be followed, except equation (E4B) applies instead of equation (E4A).

Figure 8:
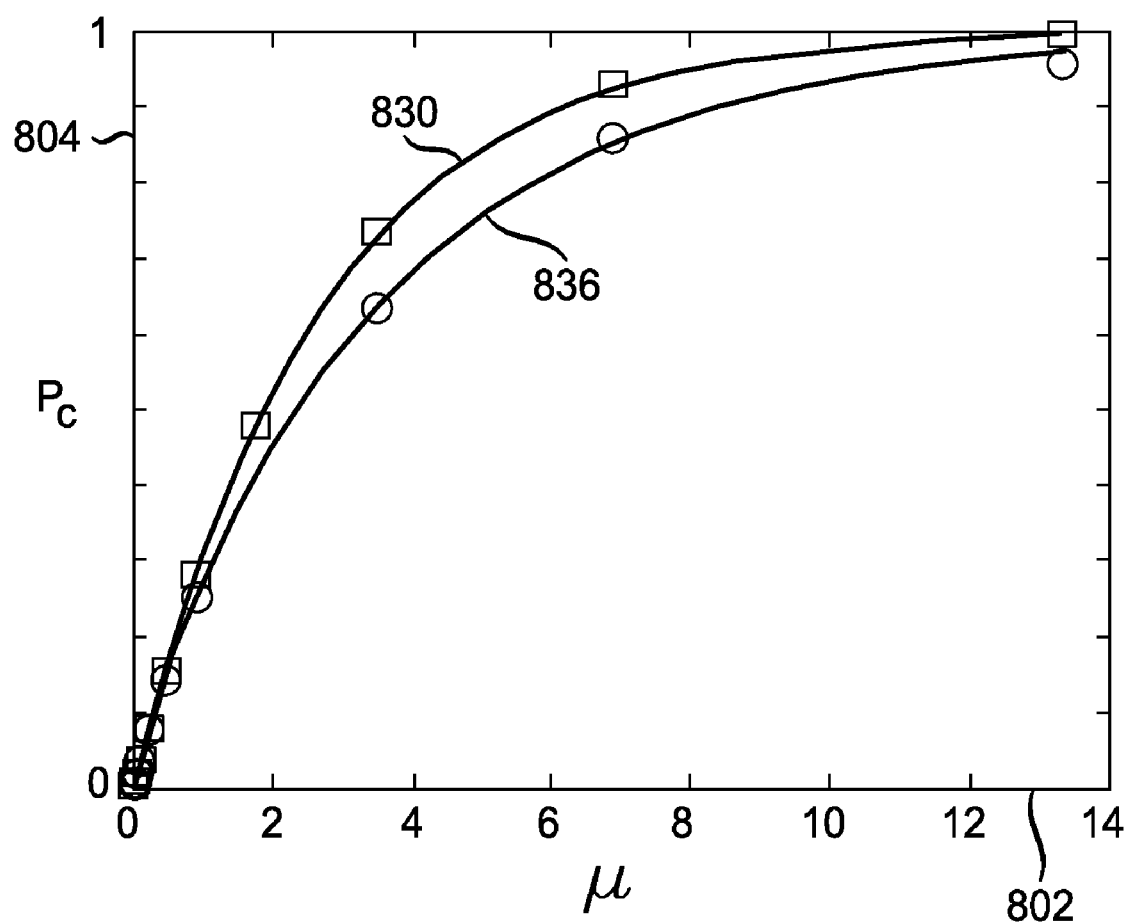
FIG. 8 shows plots of probability count for a source of photon pairs as a function of the average number of photons per detector gate at a fixed trigger rate.

FIG. 8 shows plots of the measured count probability for a source of photon pairs as a function of average number of photons per detector gate at different trigger rates, over a range of approximately 100 kHz to 1 MHz. The horizontal axis 802 represents the average number of photons per detector gate, $$\mu_{pp} = \frac{10^{(P_{pp}/10)}}{1000 \times h \times v} \times \tau_g,$$

over the range from 0.1 to 14. The subscript pp indicates values determined with a source of photon pairs. The data is taken at two different trigger rates (R): points 830 and points 836 correspond to measured values for R=100 kHz and R=1 MHz, respectively. The plotted lines correspond to fitted curves.

FIG. 9A shows plots of the extracted detector efficiency as a function of trigger rate. The horizontal axis 902 represents the trigger rate R (kHz). The vertical axis 904 represents the extracted detector efficiency η (%). Two data points, data point 901 and data point 903, are shown for a source of photon pairs.

FIG. 9B shows a plot of the after-pulse parameter as a function of time. The horizontal axis 932 represents time (μS). The vertical axis 934 represents $$Q(t) = Q_0 \exp(-t/\tau),$$

with the afterpulsing constant $Q_0$ and the detrap time $\tau$ extracted from the fits. Plot 940 shows the results for a source of photon pairs. The obtained values of the detector efficiency and after-pulse parameter agree with the values independently measured by a different method.

Figure 10:
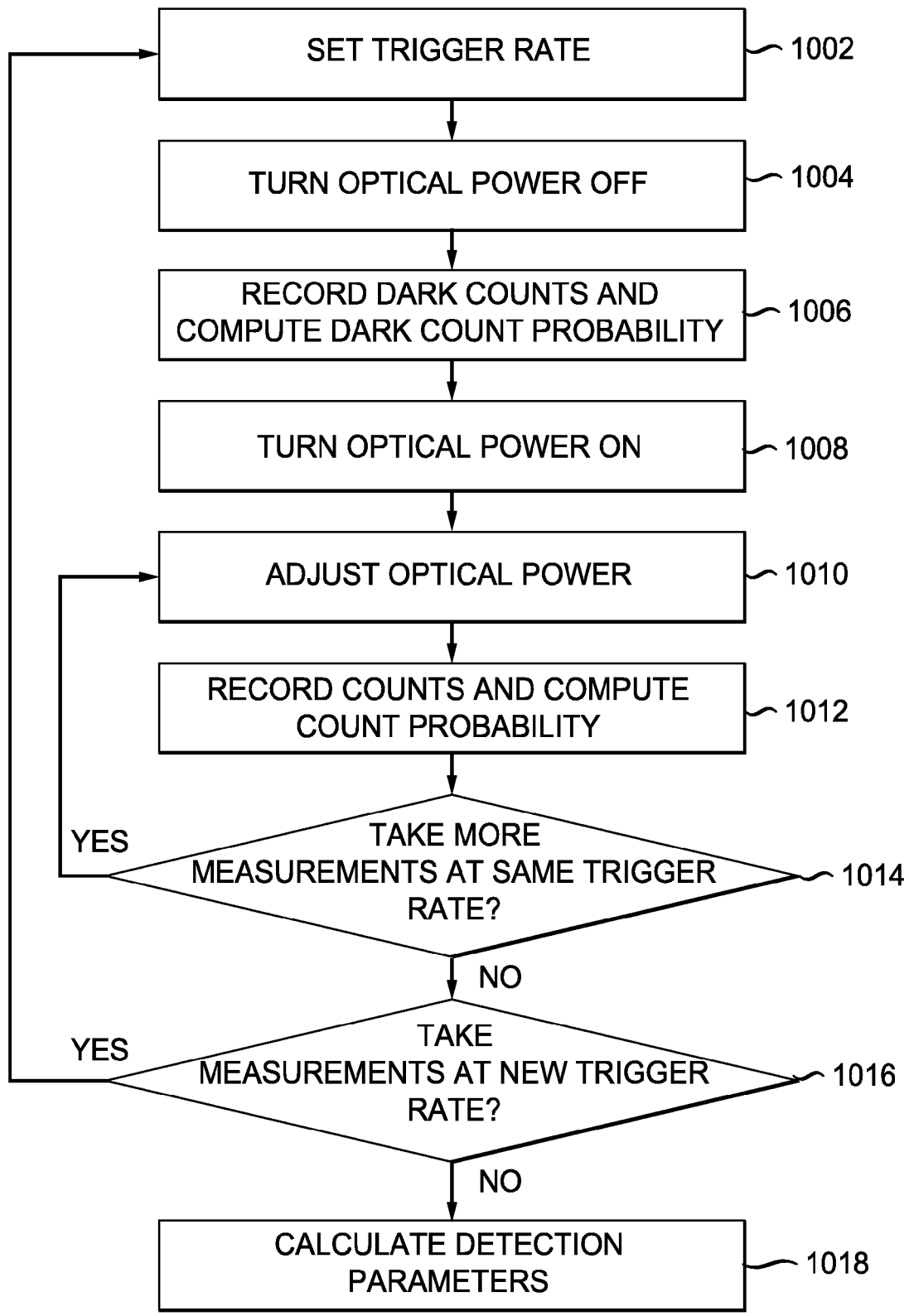
FIG. 10 shows a flowchart of a method for measuring the operational parameters of a single-photon detector using a source of photon pairs.

FIG. 10 shows a flowchart of steps for a method for measuring the operational parameters of single-photon detector 210. The SPD measurement system is configured as shown in FIG. 7A. For a specific value of R, counts are measured under dark conditions and under multiple values of input optical power. The measurements are then repeated for multiple values of R. After all the measurements have been completed, the operational parameters are computed. Since the operational parameters are a function of temperature, the temperature of single-photon detector 210 is stabilized at a user-specified temperature prior to the set of measurements. Measurements can be taken over a user-specified set of temperatures, if desired.

In step 1002, the trigger rate R is set at a first value for single-photon detector 210. The process then passes to step 1004, in which the optical power from source of photon pairs 702 is turned OFF. The process then passes to step 1006, in which dark counts $D_{dark}$ over a specified measurement time are recorded by counter 214. The dark count probability is then computed from $$P_{dc} = D_{dark}/R.$$

The process then passes to step 1008, in which the optical power from source of photon pairs 702 is turned ON. The process then passes to step 1010, in which variable attenuator 708 is adjusted to set the input optical power to single-photon detector 210 to a first value. The process then passes to step 1012, in which the counts D are recorded over a specified measurement time. The count probability is then computed from $$P_c = D/R.$$

The process then passes to decision step 1014. If more measurements at the same trigger rate are to be taken, then the process returns to step 1010, in which variable attenuator 708 is adjusted to set the input optical power to single-photon detector 210 to a different value. For a fixed value of trigger rate, step 1010-step 1014 are iterated for a user-specified number of cycles. The process then passes to decision step 1016. If measurements are to be taken at a different trigger rate, then the process returns to step 1002, in which the trigger rate is set to a different value. Step 1002-step 1016 are iterated for a user-specified number of cycles. When the set of measurements has been completed, then the process passes from step 1016 to step 1018.

In step 1018, the following operational parameters of the detector are computed by fitting the measured data to (E3): the efficiency as a function of trigger rate η(R), the afterpulsing constant $Q_0$, and the detrap time $\tau$.

Figure 11:
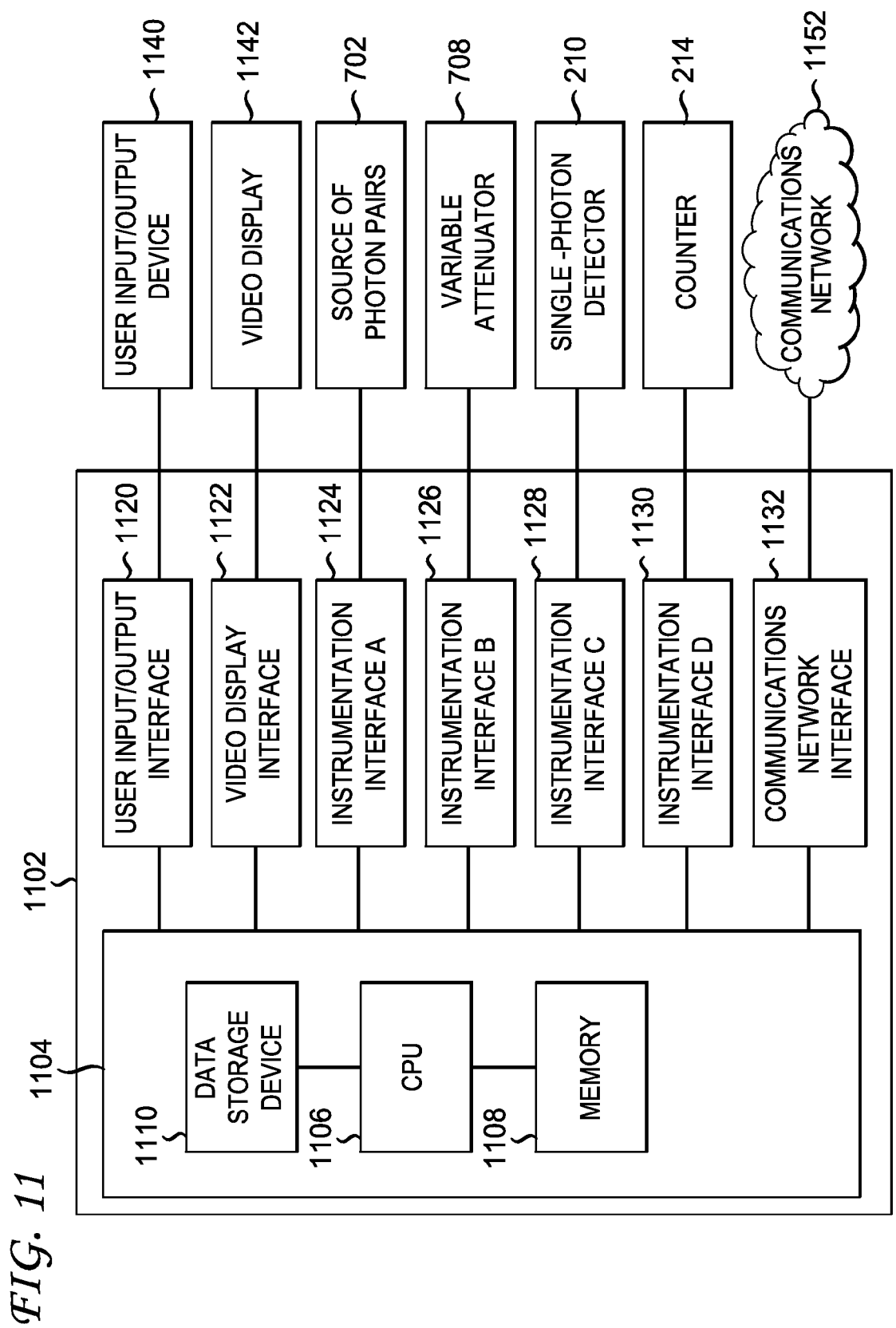
FIG. 11 shows a schematic of a computational system for implementing a measurement control system.

FIG. 11 shows a schematic of an embodiment of a computational system for implementing a measurement control system 720 (see FIG. 7A). One skilled in the art can construct the computational system 1102 from various combinations of hardware, firmware, and software. One skilled in the art can construct the computational system 1102 from various combinations of electronic components, such as general purpose microprocessors, digital signal processors (DSPs), application-specific integrated circuits (ASICs), and field-programmable gate arrays (FPGAs).

Computational system 1102 comprises computer 1104, which includes a central processing unit (CPU) 1106, memory 1108, and data storage device 1110. Data storage device 1110 comprises at least one non-transitory, persistent, tangible computer readable medium, such as non-volatile semiconductor memory, a magnetic hard drive, and a compact disc read only memory.

Computational system 1102 can further comprise one or more user input/output interfaces that interface computer 1104 with user input/output devices. For example, user input/output interface 1120 interfaces computer 1104 with user input/output device 1140. Examples of user input/output device 1140 include a keyboard, a mouse, and a local access terminal. Data, including computer executable code, can be transferred to and from computer 1104 via user input/output interface 1120.

Computational system 1102 can further comprise video display interface 1122, which drives video display 1142 and can receive user input from video display 1142.

Computational system 1102 can further comprise one or more instrumentation interfaces. For example, instrumentation interface A 1124 interfaces computer 1104 with source of photon pairs 702; instrumentation interface B 1126 interfaces computer 1104 with variable attenuator 708; instrumentation interface C 1128 interfaces computer 1104 with single-photon detector 210; and instrumentation interface D 1130 interfaces computer 1104 with counter 214 (see FIG. 2B).

Computational system 1102 can further comprise one or more communications network interfaces that interface computer 1104 with communications networks, such as local area networks and wide area networks. Data, including computer executable code, can be transferred to and from computer 1104 via communications network interfaces. For example, communications network interface 1132 interfaces computer 1104 with communications network 1152. Computational system 1102 can be remotely accessed and controlled via communications network 1152.

As is well known, a computer operates under control of computer software, which defines the overall operation of the computer and applications. CPU 1106 controls the overall operation of the computer and applications by executing computer program instructions that define the overall operation and applications. The computer program instructions can be stored in data storage device 1110 and loaded into memory 1108 when execution of the program instructions is desired. The method steps shown in the flowchart in FIG. 10 can be defined by computer program instructions stored in memory 1108 or in data storage device 1110 (or in a combination of memory 1108 and data storage device 1110) and controlled by the CPU 1106 executing the computer program instructions. For example, the computer program instructions can be implemented as computer executable code programmed by one skilled in the art to perform algorithms implementing the method steps shown in the flowchart in FIG. 10. Accordingly, by executing the computer program instructions, the CPU 1106 executes algorithms implementing the method steps shown in the flowchart in FIG. 10.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the present disclosure and that various modifications may be implemented by those skilled in the art without departing from the scope and spirit of the disclosure. Those skilled in the art could implement various other feature combinations without departing from the scope and spirit of the disclosure.

The invention claimed is:

1. An apparatus for characterizing a single-photon detector operating with a plurality of trigger rates, the apparatus comprising:
    means for, for each of the plurality of trigger rates:
        recording dark counts with the single-photon detector and computing a dark count probability; and
        for each of a plurality of optical powers generated by a source of photon pairs, recording counts with the single-photon detector and computing a count probability; and
    means for calculating a single-photon detector operational parameter based at least in part on the plurality of computed dark count probabilities and the plurality of computed count probabilities;
    wherein:
    the means for calculating a single-photon detector operational parameter comprises means for calculating at least one of:
        an efficiency $\eta$;
        an afterpulsing constant $Q_0$; and
        a detrap time $\tau$; and
    the means for calculating at least one of an efficiency $\eta$, an afterpulsing constant $Q_0$, and a detrap time $\tau$ comprises:
        means for fitting the plurality of computed dark count probabilities and the plurality of computed count probabilities to a user-defined relationship comprising:

$$P_c = P1\{\bullet\} + \frac{1}{2}\sqrt{P2\{\bullet\} + P3\{\bullet\}},$$

wherein:

$$P1\{\bullet\} = \frac{2 - e^{1/R\tau} - (1 - P_{dc})(1 - P_{ph})(1 - Q_0)}{2},$$

-continued $$P2\{\bullet\} = [2 - e^{1/R\tau} - (1 - P_{dc})(1 - P_{ph})(1 - Q_0)]^2,$$

$$P3\{\bullet\} = 4(e^{1/R\tau} - 1)[1 - (1 - P_{dc})(1 - P_{ph})],$$

$$P_{ph} = 1 - \exp(-\mu\eta(2 - \eta)),$$

$P_c$ is a count probability,
$P_{dc}$ is a dark count probability,
$\mu$ is an average number of photons per detector gate, and
R is a trigger rate.

2. A computer readable medium storing computer program instructions for characterizing a single-photon detector operating with a plurality of trigger rates, wherein the computer program instructions, when executed on a processor, cause the processor to perform a method comprising:
    for each of the plurality of trigger rates:
        recording dark counts with the single-photon detector and computing a dark count probability; and
        for each of a plurality of optical powers generated by a source of photon pairs, recording counts with the single-photon detector and computing a count probability; and
    calculating a single-photon detector operational parameter based at least in part on the plurality of computed dark count probabilities and the plurality of computed count probabilities;
    wherein:
    calculating a single-photon detector operational parameter comprises calculating at least one of:
        an efficiency $\eta$;
        an afterpulsing constant $Q_0$; and
        a detrap time $\tau$; and
    calculating at least one of an efficiency $\eta$, an afterpulsing constant $Q_0$, and a detrap time $\tau$ comprises:
        fitting the plurality of computed dark count probabilities and the plurality of computed count probabilities to a user-defined relationship comprising:

$$P_c = P1\{\bullet\} + \frac{1}{2}\sqrt{P2\{\bullet\} + P3\{\bullet\}},$$

wherein:

$$P1\{\bullet\} = \frac{2 - e^{1/R\tau} - (1 - P_{dc})(1 - P_{ph})(1 - Q_0)}{2},$$

$$P2\{\bullet\} = [2 - e^{1/R\tau} - (1 - P_{dc})(1 - P_{ph})(1 - Q_0)]^2,$$

$$P3\{\bullet\} = 4(e^{1/R\tau} - 1)[1 - (1 - P_{dc})(1 - P_{ph})],$$

$$P_{ph} = 1 - \exp(-\mu\eta(2 - \eta)),$$

$P_c$ is a count probability,
$P_{dc}$ is a dark count probability,
$\mu$ is an average number of photons per detector gate, and
R is a trigger rate.

* * * * *